United States Patent

Catterton et al.

[11] Patent Number: 5,725,655
[45] Date of Patent: Mar. 10, 1998

[54] METHOD FOR NEW CONCRETE FROM OLD CONCRETE

[76] Inventors: Robert L. Catterton, 3639 Branhum St., Edgewater, Md. 21037; Tony H. Harris, 7335 St. Mary Ave., LaPlata, Md. 20646; Steven C. Harris, 12500 Meadowood Dr., Silver Spring, Md. 20910

[21] Appl. No.: 714,271

[22] Filed: Sep. 17, 1996

[51] Int. Cl.[6] .................................. C04B 18/04
[52] U.S. Cl. .................. 106/738; 106/697; 106/737; 106/713; 106/816; 106/817; 106/819
[58] Field of Search .................. 106/713, 737, 106/738, 697, 816, 817, 819; 241/DIG. 38

[56] References Cited

U.S. PATENT DOCUMENTS

| 5,328,508 | 7/1994 | Lin | 106/738 |
| 5,525,153 | 6/1996 | Cosola | 106/697 |

Primary Examiner—Michael Marcheschi

[57] ABSTRACT

A method is described for making concrete mixture by blending new batch cement with recycled concrete material (curb & gutter, sidewalk, brick, block, asphalt & various other concrete items). This new process will enable discarded concrete materials to be reused as a valuable product.

2 Claims, No Drawings

METHOD FOR NEW CONCRETE FROM OLD CONCRETE

SUMMARY OF INVENTION

In accordance with the invention, this process takes old concrete, sidewalk, paving, curb, etc. and reuses it to produce a new concrete mixture that is comparable to concrete made with virgin materials. Instead of the old materials being discarded, filling our already limited landfills, they are recycled into a useful and valuable product. Not only will the new concrete mixture create more by volume per weight, by using less material in production, but will also be produced at a substantially cheaper cost, enabling this product to be offered on the market, to the consumer, at a reduced rate.

FIELD OF INVENTION

The process relates to an improved usable concrete material, which can be made with less virgin aggregates, by utilizing recycled concrete material. Less material is needed to make the same volume of concrete mixture, which is cost effective to produce, just as workable and durable as a virgin concrete.

discarded (most likely to a landfill dump) and replaced with new virgin concrete again. However, by utilizing the crushed recycled method, as described within, the old discarded set concrete can actually be reused in making the new concrete mixture. This method will also cut down substantially on the amount of virgin materials needed, not to mention the expense and wastefulness of disposing old concrete in a landfill. By production standards, this method will prove to be not only less expensive to the consumer, but will also preserve our natural resources, a precious commodity. The coarse aggregate used in present invention consist of a mixture of recycled concrete having a size 1 ½" to 200 mesh and recycled concrete having a size 1" to 4 mesh and recycled concrete having a size of ¾" to 4 mesh. The composition according to the present indication can also be bagged.

TABLE 1

| TEST # | DESCRIPTION | STRENGTH (lbs.) |
| --- | --- | --- |
| 1 | 154 lbs. RC 6/28 lbs. CEMENT | 1010 |
| 2 | 154 lbs. RM 6/28 lbs. CEMENT | 1150 |
| 3 | 154 lbs. RM 6/28 lbs. CEMENT | 890 |
| 4 | 77 lbs. RC 6/14 lbs. CEMENT | 1220 |
| 5 | 154 lbs. RC 6/28 lbs. CEMENT | 1210 |
| 6 | 154 lbs. RC 6/28 lbs. CEMENT | 1390 |
| 7 | 105 lbs. RC 6/26.5 lbs. CEMENT | 2140 |
| 10 | 87.9 lbs. RC 6/27 lbs. CEMENT (wet test) | 1870 |
| 11 | 48.6 lbs. RC 57/62 lbs. SAND/27 lbs. CEMENT | NO TEST |
| 12 | 48.6 lbs. RC 57 (washed)/62 lbs. SAND/27 lbs. CEMENT | 2960 |
| 13 | 88 lbs. RC 6/27 lbs. CEMENT | 2130 |

BACKGROUND OF THE INVENTION

Concrete is a building material made by mixing cement fine and coarse aggregates in water. The gathering of old concrete, asphalts, brick, block, sand, gravel and other grit type materials normally out of specification in its present state. The old concrete, asphalt, brick, sand, gravel and other grit material being crushed and sized does not have to be any minimum compressive strength to be mixed with new concrete. Once virgin concrete is mixed, poured and set, it is unable to be reused for any other purpose, it must then be Various concrete composition were made which are described in Table 1.

* RC6 is recycled material having a 1 ½" to 200 mesh.
* RM6 is recycled material having a 1 ½" to 200 mesh.
* RC57 is recycled material having a 1" to 4 mesh.

TABLE 2

| TEST # | 7 day strength | approx. 21 day strenght | DESCRIPTION |
| --- | --- | --- | --- |
| 1 | 1010 | 1710 | 154 lbs. RC 6/28 lbs. CEMENT |
| 2 | 1150 | 1720 | 154 lbs. RM 6/28 lbs. CEMENT |
| 3 | 890 | 1260 | 154 lbs. RM 6/28 lbs. CEMENT |
| 6 | 1390 | 2200 | 154 lbs. RC 6/28 lbs. CEMENT |
| 7 | 2140 | 1720 | 105 lbs. RC 6/26.5 lbs. CEMENT |
| 8 | 4230 | 5110 | 62 lbs. SAND/90 lbs. GRAVEL/26.5 CEMENT |
| 9 | 4430 | 5410 | 65 lbs. SAND/90 lbs. BLUE STONE #57/ 26.5 CEMENT |
| 10 | 1870 | 2340 | 87.9 lbs. RC 6/27 lbs. CEMENT (wet test) |
| 12 | 2960 | 4090 | 48.6 lbs. RC 57 (washed)/62 lbs. SAND/ 27 lbs. CEMENT |
| 13 | 2130 | 2870 | 88 lbs. RC 6/27 lbs. CEMENT |

Various concrete composition were made as described in Table 2. Test #8 and 9 are camparative samples using virgin aggregate.

We claim:

1. A concrete composition consisting of portland cement, sand and a coarse aggregate, wherein the coarse aggregate consists of a mixture of (a) recycled concrete having a size of 1 ½" to 200 mesh, (b) recycled concrete having a size of 1" to 4 mesh, (c) recycled concrete having a size of ¾" to 4 mesh, and (d) recycled asphalt, said composition having a 21 day compressive strength of at most 4090 PSI.

2. A bagged concrete composition consisting of portland cement, sand and a coarse aggregate, wherein the coarse aggregate consists of a mixture of (a) recycled concrete having a size of 1 ½" to 200 mesh, (b) recycled concrete having a size of 1" to 4 mesh, (c) recycled concrete having a size of ¾" to 4 mesh, and (d) recycled asphalt, said composition having a 21 day compressive strength of at most 4090 PSI.

* * * * *